United States Patent
Baker (10) Patent No.: US 6,885,513 B1
(45) Date of Patent: Apr. 26, 2005

(54) MAGNETIC PRINTING SYSTEM FOR THIN RECORDING MEDIA

(76) Inventor: Bill Richard Baker, 3824 Vineyard Dr., Redwood City, CA (US) 94061

( * ) Notice: Subject to any disclaimer, the term of this patent is extended or adjusted under 35 U.S.C. 154(b) by 0 days.

(21) Appl. No.: 10/328,432

(22) Filed: Dec. 24, 2002

Related U.S. Application Data (60) Provisional application No. 60/344,256, filed on Dec. 27, 2001.

(51) Int. Cl.[7] .................................. G11B 5/86
(52) U.S. Cl. ........................ 360/17; 360/15; 360/16
(58) Field of Search ..................... 360/16, 17

(56) References Cited

U.S. PATENT DOCUMENTS

| | | |
|---|---|---|
| 3,686,649 A | 8/1972 | Behr |
| 3,869,711 A | 3/1975 | Bernard et al. |
| 5,333,140 A | 7/1994 | Moraru et al. |
| 5,784,296 A | 7/1998 | Baker et al. |
| 5,870,244 A * | 2/1999 | Yokomachi et al. ...... 360/77.16 |
| 5,991,104 A | 11/1999 | Bonyhard |
| 6,304,407 B1 | 10/2001 | Baker et al. |
| 6,377,414 B1 * | 4/2002 | Wang ........................... 360/59 |
| 6,469,848 B1 | 10/2002 | Hamada et al. |
| 6,602,301 B1 * | 8/2003 | Komatsu et al. .............. 360/17 |
| 6,785,070 B2 * | 8/2004 | Taniguchi et al. ............ 360/17 |
| 2002/0080507 A1 * | 6/2002 | Taniguchi et al. ............ 360/17 |
| 2002/0101670 A1 | 8/2002 | Ishida et al. |

OTHER PUBLICATIONS

Ishida, et al., "Printed media technology for an effective and inexpensive servo track writing of HDDs", *IEEE Trans. Magn.*, vol. 37, No. 4, Jul., 2001, pp1875–1877.

Sugita, et al., "A novel magnetic contact duplication technique for servo–writing on magnetic disks", *IEEE Trans. Magn.*, vol. 36, No. 5, Sep., 2000, pp2285–2287.

Saito, et al., "Magnetic printing technique for longitudinal thin film media with high coercivity of 6000 Oe", *J. Appl. Phys.*, vol. 91, No. 10, May, 2002, pp8688–8690.

Baker, "Tradeoffs for magnetic printing of servo patterns", *J. Appl. Phys.*, vol. 91, No. 10, May, 2002, pp8691–8693.

Wang, "Photo thermal patterning on magnetic media", *J. Appl. Phys.*, vol. 91, No. 10, May, 2002, pp8685–8687.

Baker, "Thermal transfer in magnetooptic printing of servo patterns", *IEEE Trans. Magn.*, vol. 38, No. 5, Sep., 2002, pp2198–2200.

Saito, et al., "A novel magnetic printing method for perpendicular recording media", *IEEE Trans. Magn.*, vol. 38, No. 5, Sep., 2002, pp2195–2197.

Sugita, et al., "Magnetization patterns of slave media duplicated by using patterned master media", *J. Appl. Phys.*, vol. 91, No. 10, May, 2002, pp8694–8696.

* cited by examiner

*Primary Examiner*—Sinh Tran
*Assistant Examiner*—Glenda Rodriguez (57) ABSTRACT

A system and method for incrementally recording blocks of data such as servo information on magnetic media such as hard disks, flexible disks or tapes. The system comprises a master element with permeable features configured according to the block of data and corresponding to a small fraction of the area of the medium. A predetermined portion of the medium is advanced and brought in proximity to the master element. An electromagnet applies a localized field to copy the data to the selected portion of the medium. The field of the electromagnet is decreased before the next predetermined portion of the medium is advanced thereby avoiding damage to previously recorded data.

9 Claims, 5 Drawing Sheets

MAGNETIC PRINTING SYSTEM FOR THIN RECORDING MEDIA

CROSS-REFERENCE TO RELATED APPLICATIONS

This application claims the benefit of Provisional Patent Application Ser. No. 60/344,256 filed on Dec. 27, 2001.

FEDERALLY SPONSORED RESEARCH

Not Applicable

SEQUENCE LISTING OR PROGRAM

Not Applicable

BACKGROUND OF THE INVENTION

1. Field of the Invention

This invention relates to printing or rapidly transferring fixed data to magnetic storage media and, more particularly, to incrementally printing servo data on both sides of thin recording media.

2. Description of the Prior Art

Modern magnetic recording systems have servo information or position markers written in an interleaved fashion on the same surface on which data are recorded. To simplify the system the same head is used to read the user data and the servo information. Various special formats are used for the servo information to enable using measurements and subsequent signal processing to determine the position of the read head relative to the center of the desired data track. A head movement mechanism and servo control system keep the read head close enough to the data track center to assure reliable read back of the previously written user data.

Most early hard disk systems used a special machine, a servo track writer (STW), see U.S. Pat. No. 5,333,140 to Moraru, et al., (1994), to record the servo information on the disk surface. The STW includes a clamping system to hold the hard disk drive (HDD) in a fixed reference position and an external motor with a laser or optical encoder to accurately move a reference pin that extended into the HDD. The actuator or head positioning mechanism of the HDD is biased against the pin so the write head of the HDD can be placed at any desired radius by moving the external motor according to its encoder system. The STW also includes a clock head that is temporarily placed on a surface of the disk by means of a special aperture in the HDD case. Circuitry of the STW writes a clock signal or timing reference by applying a pattern of write current to the clock head. The clock head reads the timing reference signal as the HDD write head is moved to any desired radius. Since the timing reference is fixed relative to the disk it is possible to write servo patterns of a desired form as function of radius and angle on the disk. Related STW are used for removable media such as the ZIP floppy diskette system manufactured by Iomega Corporation.

It is necessary to turn the disk through at least one revolution to write the servo information, and another fraction of a revolution is required to move the head to the next radius. Many servo patterns use the edges of special bursts or sub elements in the determination of the position from the read back signal, so it is necessary to write the servo bursts at radial displacements of a fraction of the data track width. Therefore it is usually required to write two or more servo tracks for each data track. Since HDDs now have about one hundred thousand or more data tracks, it may require tens of minutes to write the servo pattern.

Because the enclosure of the HDD is required to have openings for the clock head and for the reference pin it is necessary to use the STW in a special clean room to avoid contamination of the head-media interface. It is expensive and difficult to maintain the complex STW in such a clean environment.

A new "printing" approach was offered in U.S. Pat. No. 3,869,711 to Bernard, et al., (1975). That method was advanced recently (Ishida, T., et al., "Printed Media Technology for an Effective and Inexpensive Servo Track Writing of HDDs", IEEE Trans. Magn., p1875, 2001 and Sugita, R., et al., "A Novel Magnetic Contact Duplication Technique for Servo-Writing on Magnetic Disks", IEEE Trans. Magn. p2285, 2001). In that method the desired servo pattern is replicated in a "master element" consisting of a silicon substrate about one millimeter thick with strips of highly permeable cobalt about one half micron thick embedded in the silicon. The face of the master element containing the cobalt strips is placed in contact with a D.C. erased slave disk. Then a permanent magnet producing an oppositely directed field is brought close to the back surface of the master and is rotated one revolution relative to the master-slave pair. The cobalt strips shield portions of the slave disk leaving them in the original D.C. state, but gaps in the cobalt pattern allow the field to penetrate and reverse magnetization of the adjacent portions of the slave disk. This rapid transfer of the pattern to the entire surface of the slave disk, or "printing", is done as the last step at the end of a conventional disk manufacturing line.

Important feature sizes, typically line widths and the thickness of cobalt strips, have been steadily decreasing, but the transition density of printing currently lags that of conventional write heads by a factor of about five. Therefore it was proposed in U.S. Pat. No. 6,304,407 to Baker, et al., (2001), to use the printed pattern as a reference system for self-servowriting (SSW). Because the printing method involves several processes such as optical diffraction, diffusion in the photo resist, and shadowing during sputtering of the cobalt, it is difficult to produce square corners or small radii of curvature at the ends of the cobalt strips. Therefore phase methods are used as in U.S. Pat. No. 3,686,649 to Behr, (1972), for the position information, and the phase is measured by discrete Fourier transforms (DFT) in the manner of U.S. Pat. No. 5,784,296 to Baker, et al., (1998). In this method the ends of the strips in the printed chevron components are excluded from the sample window, and pulses are measured at the long, clean edges.

After assembly of the HDD it is removed from the clean room and placed on a self-test rack where it begins its self-servowriting directed by the embedded firmware. Well known self-test methods measure possible pattern eccentricity and any minor errors of the position information for each servo block printed on the disk. Then corrections are applied for subsequent writing of a final servo pattern. The relatively low additional cost of printing one surface of a disk has eliminated the need for an expensive STW and the clean room in which to operate it.

Proper choice of geometry including width and thickness of the cobalt elements and width of the gaps is necessary to assure magnetic switching of the slave medium next to the gaps of the master without saturating the cobalt film to produce "secondary gaps" and consequent writing of spurious pulses or noise (Saito, A, et al., "Magnetic printing technique for longitudinal thin film media with high coercivity of 6000 Oe", J. Appl. Phys., V 91, p 8688, 2002 and Baker, "Tradeoffs for magnetic printing of servo patterns", J. Appl. Phys., p8691, 2002).

Because the master is about one millimeter thick and the magnet gap must be somewhat larger it follows that the applied field will also have a high level at the back surface of a thin slave medium. This problem is especially significant for flexible disks such as floppies or for tape systems where the front and back recording surfaces are separated by a film only about 10 microns thick. For thin recording media the prior printing methods would "print through" and corrupt the first printed surface as regions are later printed on the second surface.

Prior art was intended for printing servo patterns on a disk, and it requires fabrication of a master element covering the entire data area of the disk surface. Such a master element is expensive to make, and it is not feasible for a tape system where the recording medium may be many meters in length. The prior art also requires a clamping system that can maintain spacing of a few nanometers between the slave medium and the pattern areas of the master element. Unfortunately the surfaces of commercial hard disks are wavy and may deviate a few microns from a true plane, so the clamping is difficult.

As is well known in the disk drive industry the number of servo wedges or position bearing segments of the disk must increase as the track density increase. Drives now have a few hundred wedges and the trend is toward higher densities. The patterns are made by various processes such as fine scale lithography, which is also used in the manufacture of semiconductors and read-write heads for disk drives. Those processes are expensive and the yield is low for the prior art where all servo blocks or wedges of a disk must be of acceptable quality in the master element.

For certain floppy disk or tape or card systems and for thin hard disks with high track densities it is cost effective to print both sides of the media. The prior art for printing would erase or corrupt the pattern of the first surface if the second surface were printed later. Therefore it would not be possible to independently print patterns directly on both sides of thin media. That problem is solved by the present invention which uses the fact that the tangential field components near the poles of an electromagnet are very small even when the magnet is switched on and is producing a strong field in and over its gap. When the magnet is switched off the field also dies over the gap, and the medium can be advanced without perturbing interspersed patterns previously printed on either surface.

BRIEF SUMMARY OF THE INVENTION

One object of the present invention is to provide a less expensive method to print or rapidly transfer fixed data such as servo information to either or both sides of thin flexible disks or thin hard disks without interference or degradation of the data on either side.

Another object of this invention is to enable printing such fixed or servo information on either or both sides of thin media such as those of linear tape systems without damaging the data on either side.

DETAILED DESCRIPTION

The invention comprises one or more printing subsystems, the recording medium, a motor and encoder subsystem to accurately position the medium, a robotic subsystem to load media and to bring the other subsystems to their operating positions, and a control subsystem to coordinate the interaction of all the subsystems.

Figure 1A:
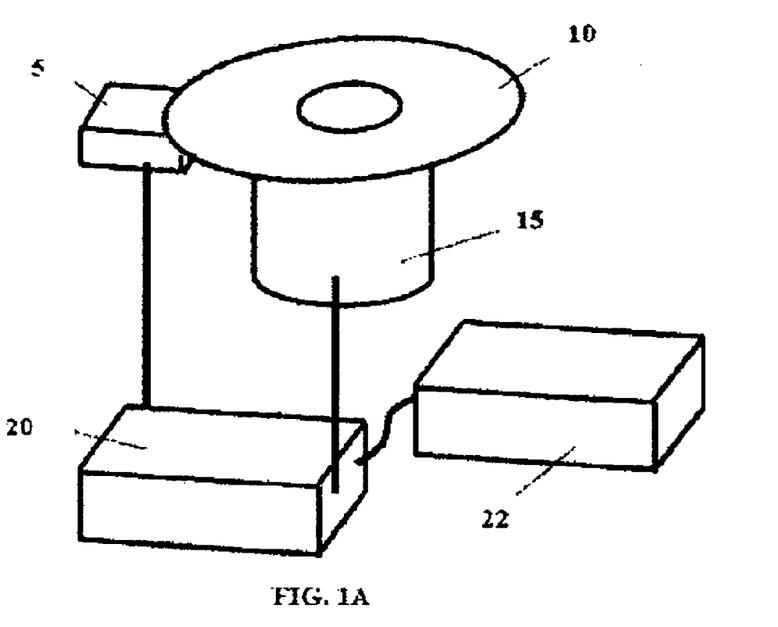
FIG. 1A is a perspective view of a printing system for disks constructed in accordance with this invention.

A disk-based system is shown in the block diagram of FIG. 1A. The disk medium 10 is loaded onto the spindle motor subsystem 15 by the robotics subsystem 22. Robotics subsystem 22 brings the disk medium 10 and the printing subsystem 5 to their operating positions. Operations are regulated by the control subsystem 20.

Figure 1B:
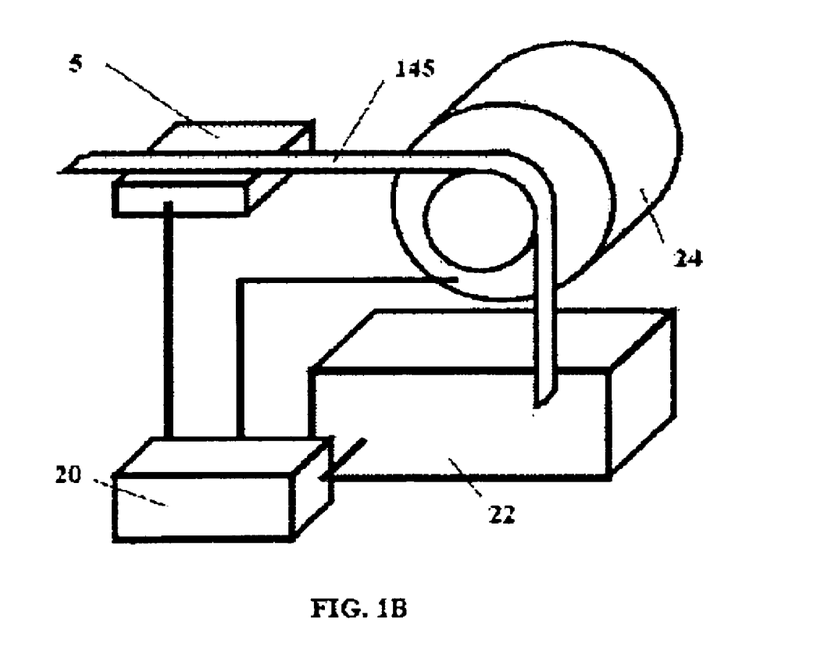
FIG. 1B is a perspective view of a printing system for linear tape constructed in accordance with this invention.

A corresponding system for tapes, such as strips of magnetic cards, FIG. 1B, comprises a tape transport subsystem with a capstan motor and encoder subsystem 24 to move the tape medium 145. The robotics subsystem 22 of said tape system loads the tape medium 145 and places it in the correct position relative to the printing subsystem 5 and the capstan motor and encoder subsystem 24.

The media 10 or 145 include particulate-coated tapes and evaporated metal tapes, disks made of similar materials, or thin hard disks.

A master element comprises a ferromagnetic film of high permeability containing elements that shape the applied field. That film is on a nonmagnetic substrate that supports the ferromagnetic elements in the proper position relative to the magnet that applies the printing field.

A printing subsystem comprises a magnet and at least one master element that can be applied to a first surface of the medium near the gap of the magnet. A second master element can also be applied to the second surface of the medium in order to print both sides at one time.

Data can also be transferred to both sides of a medium using different printing subsystems for the two surfaces. In that case to prevent damaging previously written data blocks those blocks are arranged in offset positions on the two sides of the medium. The schematic diagram of FIG. 2 for a disk medium 10 shows servo blocks or wedges 105 of the top surface and offset wedges 110 of the bottom surface. The data blocks of a tape medium would be similarly offset on the two surfaces.

Figure 5A:
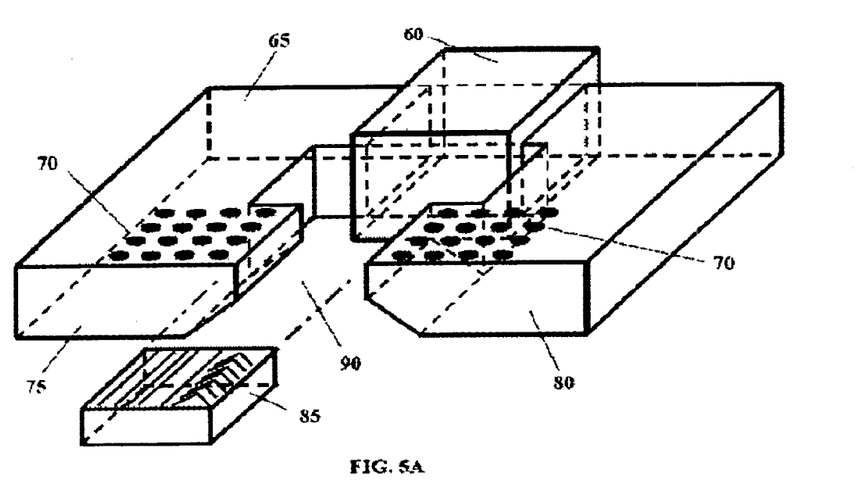
FIG. 5A is perspective view of a bipolar electromagnet and master element removed from the gap.

The shielding effect of regions close to the poles 75 and 80 of a bipolar magnet, see FIG. 5A, is used to protect previously recorded blocks and only expose a desired portion of the medium to the printing field at the well defined gap 90.

Figure 3A:
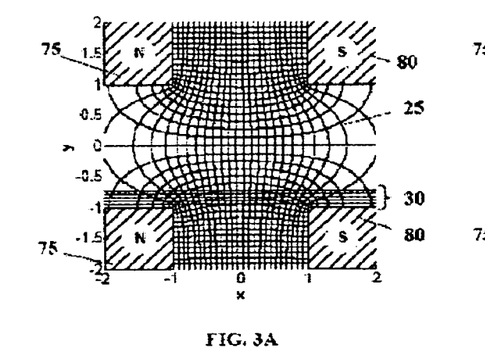
FIG. 3A is a diagram of a quadrupole magnet with vertical spacing equal to the horizontal gap.
Figure 4A:
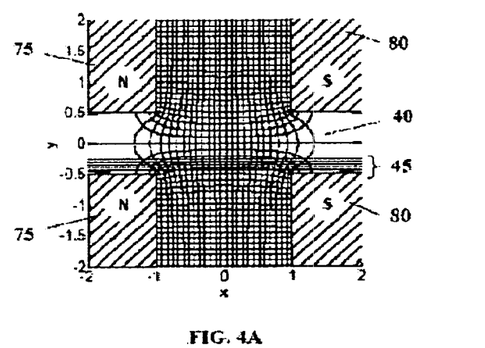
FIG. 4A is a diagram of a quadrupole magnet with vertical spacing equal to half the gap.

Two bipolar magnets of the type shown in FIG. 5A can be combined to form a quadrupole magnet as in FIGS. 3A and 4A. For highly permeable pole pieces 75 and 80, the respective field and potential distributions 25 and 40 near the gap 90 can be computed by conformal mapping techniques. The horizontal field variation 35 is shown for five spacing levels 30 above the lower poles 75 and 80 of FIG. 3A. Curves 50 show the corresponding field variations at five heights 45 for the quadrupole of FIG. 4A with half the vertical spacing of FIG. 3A However, even a bipolar magnet provides adequate field control.

Figure 5B:
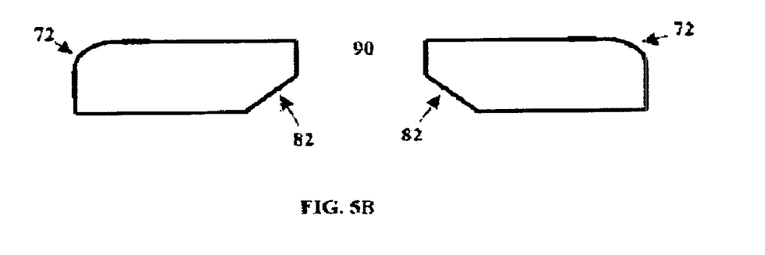
FIG. 5B is an end view of magnet poles showing important features.

Sharp outer corners of gapped magnets also create significant fields near those corners in the direction opposing the field of the main gap. FIG. 5B shows an example elliptical blend 72 of those corners that mitigates the reverse field. Relief 82 decreases the flux loss in the lower part of the gap 90.

Figure 3B:
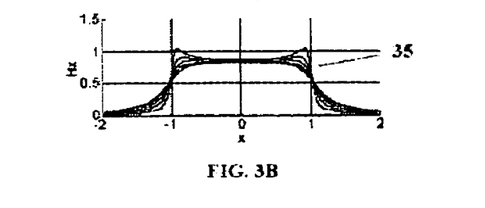
FIG. 3B is a diagram of the distribution of the horizontal field over the gap of FIG. 3A.
Figure 4B:
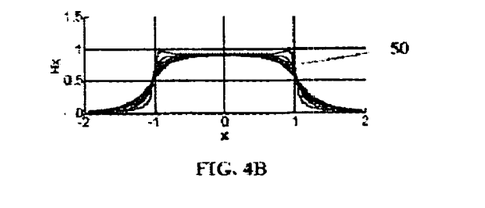
FIG. 4B is a diagram of the distribution of the horizontal field over the gap of FIG. 4A

FIGS. 3B and 4B show that Hx is increased for quadruples with smaller vertical gap; peaking occurs near the gap corners for vertical levels 45 closer to the faces of the lower poles 75 and 80. Embedding the master pattern in the gap, as in FIG. 5A, simplifies placing the top surface of the pattern at the same level as the pole faces. In a second embodiment the substrate of the pattern can extend across the pole faces where the substrate thickness is small enough to maintain the pattern elements in the high field region just above the gap.

A background field from a permanent magnet can also be applied to reduce the required field contribution from the electromagnet. The electromagnet gives simpler control of the field to adjust or calibrate to new media of different coercivity. It also allows quick reduction of the field when the medium is moved to the next printing position.

Generally the servo data are arranged in blocks or groups that are relatively short in the direction of relative motion between the medium and the read back head, and the servo blocks are wide in the direction transverse to the motion. These servo blocks alternate in the direction of motion with user data blocks, which can be altered by the recording system during normal operation. For efficient use of the recording medium the servo blocks are relatively small compared to the user data blocks.

Magnetic printing methods for longitudinal media in the present invention include an initial step of D.C. erasing or aligning the magnetization in one predetermined direction over both surfaces of the recording medium. Then the medium and master element are held together and a reverse magnetic field slightly less than the coercivity of the medium is applied. The master element concentrates the field near its gaps and reverses magnetization in adjacent regions of the medium.

One embodiment suggested in FIG. 5A places the pattern film on its substrate 85 within the gap 90 of the electromagnet. The top surface of the pattern is placed at the appropriate level approximately the same as the top surfaces of the poles to obtain small but safe spacing for the printing process when the electromagnet is turned on. Air bearing holes 70 in the poles 75 and 80 and in other surfaces can be used to refine the spacing for better control of the printing. The separation is typically only a few nanometers. Sensors of various types such as optical or capacitive can be placed in or near the poles to measure the spacing for more accurate control. Similar air bearing techniques have been used in transport systems of magnetic tape recorders and Bernoulli type floppy disks.

The discussion has focused on the longitudinal field, Hx in FIG. 3 and FIG. 4. However, analysis (Baker, "Tradeoffs for magnetic printing of servo patterns", J. Appl. Phys. V 91, p8691, 2002) shows significant vertical field is also generated at the edges of the pattern elements when the electromagnet applies the longitudinal field. Experiments confirm successful printing on perpendicular recording media (Saito, et al., "A novel magnetic printing technique for perpendicular recording media", IEEE Trans. Magn., p2195, 2002).

Figure 6:
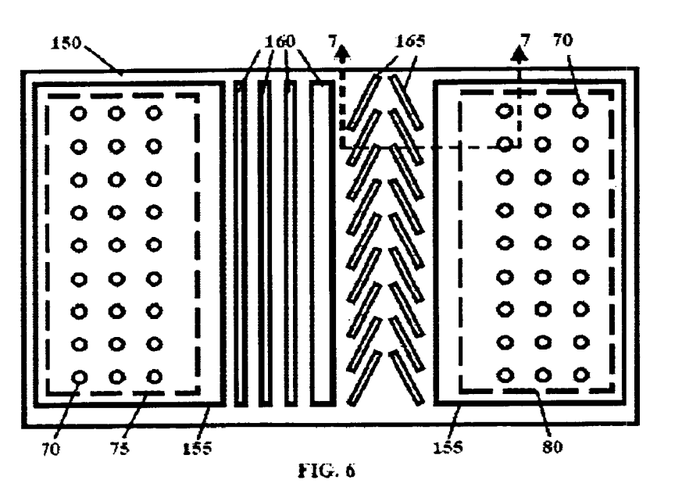
FIG. 6 is a diagram of a master element with flux guides in the magnetic film extending past the magnet gap.
Figure 7:
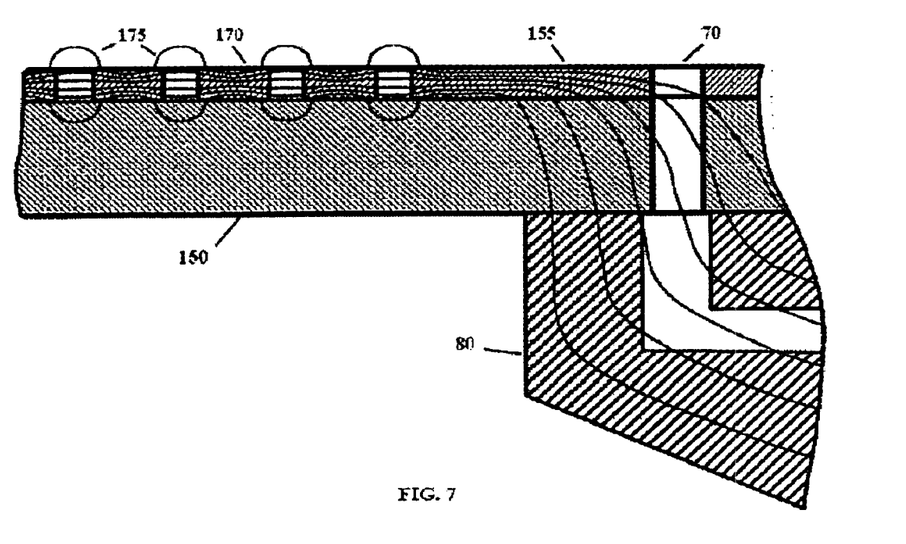
FIG. 7 is a cross section of FIG. 6 showing flux lines through a magnet pole, the substrate and magnetic film of the master element.

A preferred embodiment is shown in FIGS. 6 and 7 where the master element is placed over the electromagnet and extending some distance over the poles on either side of the gap. In this case the ferromagnetic film includes larger areas 155 that serve as flux guides to direct the magnetic field from the poles over to the active features of the pattern. The lower reluctance of the flux guides enhances the fringing field at the gaps of the pattern as desired, and the alignment of the master pattern relative to the much larger gap of the electromagnet is easier.

In all these methods the surfaces of the poles 75 and 80 of the magnet, FIG. 5, and other transport elements can be provided with various holes 70 or recesses connected to vacuum or to pressurized air or other gases through appropriate channels not shown in all figures. Then air bearing techniques such as those used in vacuum columns of tape transports or the Bernoulli plates used for some floppy disk mechanisms can be used to aid in moving the medium above the magnet or to hold the medium during printing. Combinations of said holes 70 or recesses can also help control the exact distance between medium 10 or 145 and magnet poles 75 and 80.

Before moving the slave medium 10 or 145, the control system 20 decreases current in the electromagnet coil 60 so that the gap field 35 or 50 will not disturb the magnetization in regions such as a servo spokes 105 or 110 that had been printed previously on either surface of the medium. When a new region to be printed is in position over the gap 90 a master element is held in proximity to one or both surfaces of the medium, and the field is increased to the level required for printing.

Figure 2:
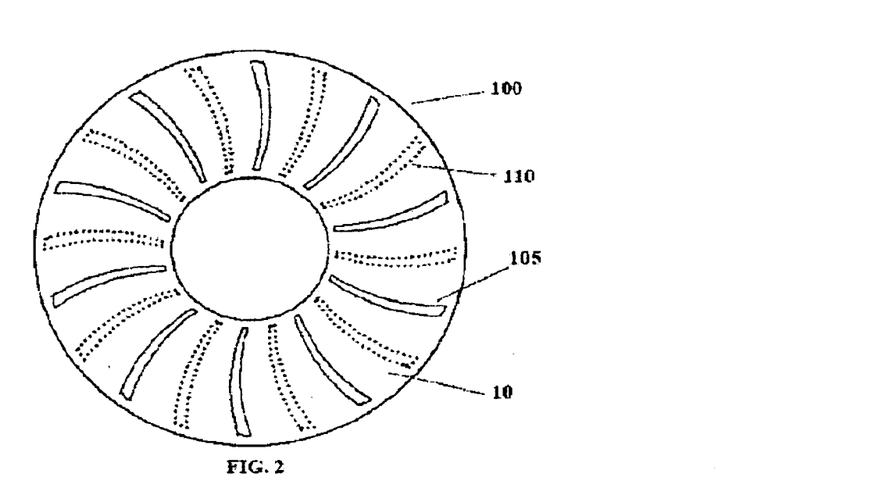
FIG. 2 is a plan view of a disk showing angular offsets between servo spokes on top and bottom surfaces.

As suggested by FIG. 2 the servo spokes 105 of the top surface and the spokes 110 of the bottom surface can be offset on the disk in the angular direction. The offset is in the direction of motion for a tape system. The gap of the electromagnet is sufficiently narrow to expose only one servo block of the surfaces when the required printing field is applied.

FIG. 2 of this document shows only 10 spokes per surface of the disk in order to simplify the drawings and explanation of the method. Contemporary disks may have hundreds of spokes. The gap 90 of the magnet would be smaller in order to expose only one spoke at a time to the working field.

The gap 90 of the electromagnet would generally have straight sides, as indicated in FIG. 5A, for a linear tape system or for a disk drive with a linear actuator such as the ZIP floppy drive manufactured by Iomega Corporation. For a disk drive with rotary actuator the servo spokes 105 and 10 are curved as in FIG. 2. In that case the gap 90 would also be curved correspondingly in plan view.

Most dimensions of these schematic diagrams are greatly exaggerated for the purpose of explanation. Furthermore the general structure of the pattern and of the magnet in FIGS. 5A, 5C and 6 are shown in rectangular Cartesian coordinates with an abscissa which corresponds closely to time or the down track displacement of a head in the direction of relative motion in a linear tape drive. The ordinate of the pattern diagram of FIG. 6 corresponds to the cross track direction.

Horizontal lines in FIG. 6 would map into concentric circles in the physical coordinates of a disk. If the disk drive has a simple linear actuator then vertical lines of FIG. 6 would transform to radial lines on the disk and would bound wedge shaped sectors. Most disk drives have rotary actuators so the vertical lines of FIG. 6 would map onto arcs, as suggested in FIG. 2, but they are still loci of points that could be reached by the read head at a given time. These transformations arose naturally in the development of traditional timing-based servowriters and are well known in the industry. To provide compatibility with those established concepts it is necessary to map similar liming relations onto the geometry of the printing master.

The number of pattern elements and their sizes are greatly altered in these schematic diagrams. For example the lines and spaces of the master are about one micron wide or narrower, and the usable radial segment of a 95 mm disk is about 25 mm, so there might be more than 10,000 sets of chevrons and spaces distributed in the radial direction within one wedge. The timing and position components may also extend for tens or hundreds of line and space pairs in the down track direction. The ferromagnetic film of the pattern is less than a micron thick, but the substrate would be about a millimeter thick. The gap of the magnet would also be on the order of one millimeter.

Results of printing at the inner and outer radii of disks are sometimes better for different levels of the applied field 35 or 50. Some radial adjustment of the field can be achieved by varying the width of gap 90 as a function of radius or by varying the spacing from poles 75 and 80 to medium 10 as function of radius.

In some applications it may be preferable to stop the medium 10 or 145 and adjust the separation between medium and pole faces 75 and 80 by means of the air bearing orifices 70. Because stopping and starting the motion involves some settling time, throughput may be improved by moving the medium continuously at a low speed. If the velocity is low enough transitions will be smeared only a negligible amount, and the printing can be done with the medium in motion.

For ease of manufacture of the electromagnet of FIG. 5A the yoke or core 65 can be made of two or more pieces. Well-known practices keep reluctance of the unavoidable gaps at joints very small compared to that of the main printing gap 90.

Figure 8:
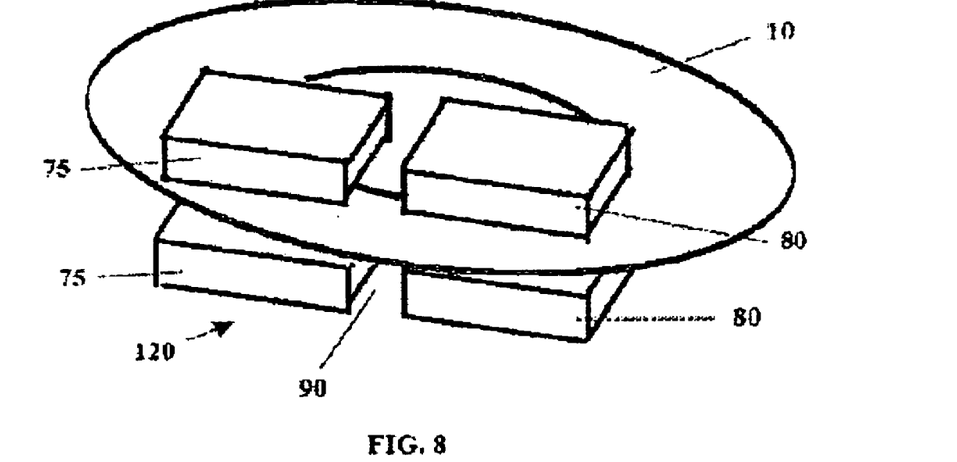
FIG. 8 is a perspective view of four magnet poles relative to a disk.
Figure 9:
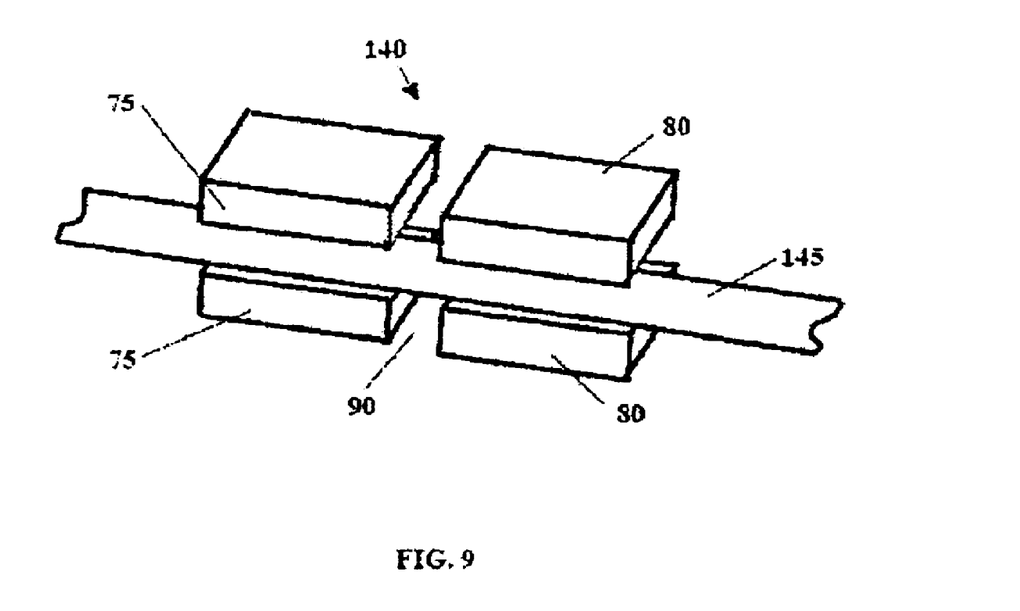
FIG. 9 is a perspective view of four magnet poles relative to a linear tape.

Two or more printing subsystems around the circumference of a disk printer FIG. 8 or along a linear tape system FIG. 9 increase throughput. A different pattern can be printed at one station to identify a certain wedge as index or to distinguish others for timing verification. The plurality of stations can be single sided or dual sided as required to optimize production rates and costs.

The single wedge patterns of this invention are more attractive as the feature sizes decrease. Smaller features may require using e-beam lithography or other high-resolution fabrication methods that are more expensive than the photolithography of the prior art.

For flexible media such as floppy disks or linear tapes adjusting the pressure in air bearings of the transport can control the separation between medium and master. Stiff hard disks cannot be deflected as easily, and in a preferred embodiment displacement motors such as extendible piezoelectric elements are placed under the master pattern substrate. Three independent extendible supports allow the surface of the master pattern to be elevated and tipped in two directions to optimize the spacing relative to the disk at each wedge or recording location.

For printing on longitudinal media it is necessary to initialize the medium or to provide a D.C. erased state. For a disk system with an electromagnet FIG. 5A, it is possible to reverse the current in coil 60 at a high magnitude and rotate the disk 10 one revolution to D.C. erase the disk. Even if a master pattern 85 is present in the gap 90 the field will pass through sufficient openings to erase all regions passing over the gap.

Well-known methods of manufacturing robotics are used to load the slave media and to place the printing stations in proper positions relative to the recording medium.

In addition to the above mentioned examples, various other modifications and alterations may be made without departing from the invention. Accordingly, the above disclosure is not to be considered as limiting and the appended claims are to be interpreted as encompassing the entire spirit and scope of the invention.

REFERENCE NUMERALS 05 electromagnet and pattern printing system
10 disk recording medium
15 spindle motor and encoder subsystem
20 control subsystem
22 robotics subsystem
24 capstan motor and encoder subsystem
25 field and potential lines of quadrupole with space equal gap
30 five example heights of recording film
35 horizontal field at five heights above lower poles of FIG. 2A
40 field and potential lines of quadrupole with space equal half of gap
45 five example heights of recording film
50 horizontal field at five heights above lower poles of FIG. 3A
60 coil
65 yoke
70 air bearing apertures
72 blend of outer pole edge
75 pole of first polarity, N
80 pole of second polarity, S
82 relief of gap
85 substrate and master pattern with positioning means
90 gap of bipolar magnet
100 example disk layout for a rotary actuator
105 spoke on top surface of slave medium
110 spoke on bottom surface of slave medium
120 quadrupole magnet arrangement for disk
140 quadrupole magnet arrangement for linear tape
145 linear tape medium
150 substrate of master element
155 flux guide of pattern film
160 timing element of pattern film
165 position element of pattern film
170 ferromagnetic film of master element
175 fringing field lines

What is claimed is:

1. Apparatus for producing recorded signals on a magnetic recording medium comprising:

(a) A master element having a permanently formed physical pattern of magnetic and nonmagnetic areas of lands and voids respectively on one surface thereof, said pattern not being magnetizable or erasable by electromagnetic means, said lands being formed of soft magnetic material having high permeability and low coercivity and disposed over a nonmagnetic base, (b) means for moving said medium relative to said element bringing a predetermined next portion of said medium to alignment with said element;

(c) means for stopping said medium and holding said medium and said element with substantially no relative motion between said medium and said element, while said element and said medium are maintained in close transducing relation;

(d) a magnetic head selected from the group consisting of bipolar heads and quadrupole heads, said magnetic head in recording position relative to said element and said medium;

(e) means for said magnetic head to provide a magnetic field to effectively record on said medium a pattern of signals corresponding to said physical pattern;

(f) means for reducing said magnetic field of said magnetic head before said medium is moved relative to said element, whereby erasure or corruption of said pattern of signals is avoided.

2. Apparatus as in claim 1, wherein said element is a sector of a rotary disk, and said medium is a magnetic disk.

3. Apparatus as in claim 1, wherein said medium is a magnetic tape.

4. Apparatus as in claim 1, wherein the pole pieces of said magnetic head and surfaces of said means for moving said medium and surfaces of said means for stopping and holding said medium comprise air bearings to control the separation between said master element and said medium.

5. Apparatus as in claim 1, further including an initializing magnetic head for providing a first magnetic field and for uniformly magnetizing said medium in a single direction prior to magnetically coupling said medium with said master element.

6. Apparatus as in claim 1, wherein said master element comprises positioning elements to adjust the separation between said master element and said medium.

7. Apparatus as in claim 6, comprising;

(a) means for sensing said separation; and (b) means for controlling said positioning elements to provide predetermined spacing between said master element and said medium.

8. Apparatus for producing recorded signals on a magnetic recording medium comprising:

(a) a plurality of master elements each having a permanently formed physical pattern of magnetic and nonmagnetic areas of lands and voids respectively on one surface thereof, said pattern not being magnetizable or erasable by electromagnetic means, said lands being formed of soft magnetic material having high permeability and low coercivity and disposed over a nonmagnetic base, said pattern corresponding to a small fraction of the area of said medium;

(b) means for moving said medium relative to said elements bringing a predetermined next set of portions of said medium to alignment with said elements;

(c) means for stopping said medium and holding said medium and said elements with substantially no relative motion between said medium and said elements, while said elements and said medium are maintained in close transducing relation;

(d) a plurality of magnetic heads selected from the group consisting of bipolar heads and quadrupole heads, each of said heads in recording position relative to one of said elements and said medium;

(e) means for said magnetic heads to simultaneously provide magnetic fields to effectively record on said medium patterns of signals corresponding to each of said physical patterns;

(f) means for reducing said magnetic fields of said magnetic heads before said medium is moved relative to said elements, thereby avoiding erasure or corruption of said patterns of signals;

whereby said physical patterns of said plurality of master elements may be different.

9. A method of recording magnetic signals on a magnetic medium corresponding to a configured pattern of magnetic and nonmagnetic areas of lands and voids respectively on a master element, said lands being formed of soft magnetic material having high permeability and low coercivity and disposed over a nonmagnetic base, said pattern corresponding to a small fraction of the area of said medium, said method comprising:

(a) premagnetizing said medium in a prescribed direction;

(b) repeating the steps of;

(1) moving a predetermined portion of said premagnetized medium into magnetically coupled relation with said configured pattern;

(2) holding said medium in unison with said configured pattern in close transducing relation to a magnetizing head;

(3) providing a constant or DC magnetic field opposed to said prescribed direction by means of said head, thereby reversing the magnetization of said medium whenever the medium encounters nonmagnetic voids on said master element and thus magnetizing said medium in selected areas determined by said pattern;

(4) reducing said DC magnetic field to a level such that previously recorded patterns will be preserved;

(5) releasing said medium to allow subsequent moving;

until a predetermined set of said patterns has been magnetically copied to said medium.

* * * * *

UNITED STATES PATENT AND TRADEMARK OFFICE
CERTIFICATE OF CORRECTION

| | | |
|---|---|---|
| PATENT NO. | : 6,885,513 B1 | Page 1 of 8 |
| APPLICATION NO. | : 10/328432 | |
| DATED | : April 26, 2005 | |
| INVENTOR(S) | : Baker | |

It is certified that error appears in the above-identified patent and that said Letters Patent is hereby corrected as shown below:

The title page showing the illustrative figure should be deleted to be replaced with the attached title page.

On the title page item (54), and Col. 1, line 1, Title "MAGNETIC PRINTING SYSTEM FOR THIN RECORDING MEDIA" should read --INCREMENTAL MAGNETIC PRINTING SYSTEM--.

The drawing sheets, consisting of Figs. 1-9, should be deleted to be replaced with the drawing sheets, consisting of Figs. 1-9, as shown on the attached page.

United States Patent
Baker (10) Patent No.: US 6,885,513 B1
(45) Date of Patent: Apr. 26, 2005

(54) MAGNETIC PRINTING SYSTEM FOR THIN RECORDING MEDIA

(76) Inventor: Bill Richard Baker, 3824 Vineyard Dr., Redwood City, CA (US) 94061

(*) Notice: Subject to any disclaimer, the term of this patent is extended or adjusted under 35 U.S.C. 154(b) by 0 days.

(21) Appl. No.: 10/328,432

(22) Filed: Dec. 24, 2002

Related U.S. Application Data

(60) Provisional application No. 60/344,256, filed on Dec. 27, 2001.

(51) Int. Cl.[7] ............................................. G11B 5/86
(52) U.S. Cl. ............................. 360/17; 360/15; 360/16
(58) Field of Search .................................. 360/16, 17

(56) References Cited

U.S. PATENT DOCUMENTS

| | | |
|---|---|---|
| 3,680,649 A | 8/1972 | Behr |
| 3,869,711 A | 3/1975 | Bernard et al. |
| 5,333,140 A | 7/1994 | Moraru et al. |
| 5,784,296 A | 7/1998 | Baker et al. |
| 5,870,244 A * | 2/1999 | Yokomachi et al. ...... 360/77.16 |
| 5,991,104 A | 11/1999 | Bonyhard |
| 6,304,407 B1 | 10/2001 | Baker et al. |
| 6,377,414 B1 * | 4/2002 | Wang ........................ 360/59 |
| 6,469,848 B1 | 10/2002 | Hamada et al. |
| 6,602,301 B1 * | 8/2003 | Komatsu et al. ............. 360/17 |
| 6,785,070 B2 * | 8/2004 | Taniguchi et al. ............. 360/17 |
| 2002/0080507 A1 * | 6/2002 | Taniguchi et al. ............. 360/17 |
| 2002/0101670 A1 | 8/2002 | Ishida et al. |

OTHER PUBLICATIONS

Ishida, et al., "Printed media technology for an effective and inexpensive servo track writing of HDDs", IEEE Trans. Magn., vol. 37, No. 4, Jul., 2001, pp1875–1877.

Sugita, et al., "A novel magnetic contact duplication technique for servo-writing on magnetic disks", IEEE Trans. Magn., vol. 36, No. 5, Sep., 2000, pp2285–2287.

Saito, et al., "Magnetic printing technique for longitudinal thin film media with high coercivity of 6000 Oe", J. Appl. Phys., vol. 91, No. 10, May, 2002, pp8688–8690.

Baker, "Tradeoffs for magnetic printing of servo patterns", J. Appl. Phys., vol. 91, No. 10, May, 2002, pp8691–8693.

Wang, "Photo thermal patterning on magnetic media", J. Appl. Phys., vol. 91, No. 10, May, 2002, pp8685–8687.

Baker, "Thermal transfer in magnetooptic printing of servo patterns", IEEE Trans. Magn., vol. 38, No. 5, Sep., 2002, pp2198–2200.

Saito, et al., "A novel magnetic printing method for perpendicular recording media", IEEE Trans. Magn., vol. 38, No. 5, Sep., 2002, pp2195–2197.

Sugita, et al., "Magnetization patterns of slave media duplicated by using patterned master media", J. Appl. Phys., vol. 91, No. 10, May, 2002, pp8694–8696.

* cited by examiner

*Primary Examiner*—Sinh Tran
*Assistant Examiner*—Glenda Rodriguez (57) ABSTRACT

A system and method for incrementally recording blocks of data such as servo information on magnetic media such as hard disks, flexible disks or tapes. The system comprises a master element with permeable features configured according to the block of data and corresponding to a small fraction of the area of the medium. A predetermined portion of the medium is advanced and brought in proximity to the master element. An electromagnet applies a localized field to copy the data to the selected portion of the medium. The field of the electromagnet is decreased before the next predetermined portion of the medium is advanced thereby avoiding damage to previously recorded data.

9 Claims, 5 Drawing Sheets

UNITED STATES PATENT AND TRADEMARK OFFICE
CERTIFICATE OF CORRECTION

PATENT NO.        : 6,885,513 B1
APPLICATION NO. : 10/328432
DATED             : Apr. 26, 2005
INVENTOR(S)       : Bill Richard Baker It is certified that error appears in the above-identified patent and that said Letters Patent is hereby corrected as shown below:

Column 6, line 60, "10" should read --110--.
Column 7, line 16, "liming" should read --timing--.
Column 9, line 5, "base," should read --base, said pattern corresponding to a small fraction of the area of said magnetic recording medium;--.

Signed and Sealed this

Sixteenth Day of September, 2008

JON W. DUDAS
*Director of the United States Patent and Trademark Office*